(12) United States Patent
Czapp et al.

(10) Patent No.: US 12,397,997 B2
(45) Date of Patent: Aug. 26, 2025

(54) CARRIER BASKET TRANSPORTER HAVING CARRIER BASKETS WITH INCREASED WEIGHT CARRYING CAPACITY

(71) Applicant: Franke Technology and Trademark Ltd., Hergiswil (CH)

(72) Inventors: Ireneusz Czapp, Reda (PL); Andrzej Tusk, Rotmanka (PL); Mario Kiel, Schwalmtal (DE)

(73) Assignee: Franke Technology and Trademark Ltd., Hergiswil (CH)

( * ) Notice: Subject to any disclaimer, the term of this patent is extended or adjusted under 35 U.S.C. 154(b) by 104 days.

(21) Appl. No.: 18/239,184

(22) Filed: Aug. 29, 2023

(65) Prior Publication Data
US 2024/0083684 A1  Mar. 14, 2024

Related U.S. Application Data

(60) Provisional application No. 63/405,155, filed on Sep. 9, 2022.

(51) Int. Cl.
*B65G 17/34* (2006.01)
*B65G 17/12* (2006.01)
(Continued)

(52) U.S. Cl.
CPC ........... *B65G 17/34* (2013.01); *B65G 17/123* (2013.01); *B65G 17/14* (2013.01); *B65G 17/16* (2013.01); *B65G 17/485* (2013.01)

(58) Field of Classification Search
CPC ...... B65G 17/34; B65G 17/36; B65G 17/123; B65G 17/12; B65G 17/14;
(Continued)

(56) References Cited

U.S. PATENT DOCUMENTS 1,736,472 A     11/1929  Wego
3,447,664 A  *  6/1969  Goedkoop ............. E04H 6/187
                                                              198/795
(Continued)

FOREIGN PATENT DOCUMENTS

EP      4279421 A1    11/2023
GB      1181451 A      2/1970

*Primary Examiner* — Mark A Deuble
(74) *Attorney, Agent, or Firm* — Volpe Koenig

(57) ABSTRACT

A carrier basket support and stabilizing system for a carrier basket having increased weight carrying capacity is provided. The system includes a plurality of cars configured to travel along a pathway, with at least some support groups including two of the cars having a carrier basket support connected thereto. The carrier basket support has a support plate connected to the first car via a pivoting connection and connected to the second car by a pivoting and sliding connection such that the cars can pivot relative to the support plate and a distance between the first and second cars can change during traversal of curves along the pathway. A support connection on the support plate is configured for connection to a mating connection on a back support of the carrier basket to allow pivoting of the carrier basket so its support surface can remain generally horizontal during movement on the pathway.

20 Claims, 19 Drawing Sheets

(51) Int. Cl.
*B65G 17/14* (2006.01)
*B65G 17/16* (2006.01)
*B65G 17/48* (2006.01)

(58) Field of Classification Search
CPC ............ B65G 2201/0202; B65G 17/16; B65G 17/485; B65G 35/00
USPC ....................................................... 198/797
See application file for complete search history.

(56) References Cited

U.S. PATENT DOCUMENTS

| | | | | |
|---|---|---|---|---|
| 4,184,584 | A * | 1/1980 | Dehlen | B65G 17/126 |
| | | | | 416/7 |
| 4,838,410 | A * | 6/1989 | Gough | B65G 17/22 |
| | | | | 198/801 |
| 4,846,337 | A * | 7/1989 | Kuhlmann | B65G 17/14 |
| | | | | 198/801 |
| 4,957,188 | A * | 9/1990 | Bavis | B65G 21/22 |
| | | | | 186/14 |
| 5,101,963 | A * | 4/1992 | Skarlupka | B65G 17/123 |
| | | | | 198/838 |
| 6,321,899 | B1 * | 11/2001 | Hannessen | B65G 17/18 |
| | | | | 198/475.1 |
| 6,554,105 | B2 * | 4/2003 | Brown | B65G 17/123 |
| | | | | 186/41 |
| 7,708,135 | B2 | 5/2010 | Ellerth et al. | |
| 8,770,385 | B2 * | 7/2014 | Hannessen | B65G 47/57 |
| | | | | 198/607 |
| 10,633,195 | B2 * | 4/2020 | Gadliger | B65G 47/57 |
| 12,172,842 | B2 * | 12/2024 | Hagenbuch | B65G 17/34 |
| 2021/0094761 | A1 | 4/2021 | Czapp et al. | |
| 2024/0132289 | A1 * | 4/2024 | Weng | B65G 17/18 |

* cited by examiner

CARRIER BASKET TRANSPORTER HAVING CARRIER BASKETS WITH INCREASED WEIGHT CARRYING CAPACITY

TECHNICAL FIELD

The present invention relates to the field of conveyor systems for use in moving products, such as delivery of orders in chain restaurants, bars, cafeterias, or the like. More particularly, the invention relates to a system for supporting and stabilizing the carrier basket as it is moved along by the conveyor between the loading and/or unloading stations.

BACKGROUND

Applicant has developed and markets an overhead conveyor system which is based on a continuous track made up into a closed loop that contains an endless "train" of small wheeled cars connected together. The track is normally suspended from the ceiling or wall and can be made to snake through a building from a loading point to an unloading point and back again. Food products to be transported need to be in packages or bags, which are placed in carrier baskets carried by some of the wheeled cars. Various means may be provided to unload or release the packages or bags from the carrier basket and the food placed into a holding tray.

Another food transport system for the vertical transport of packaged food items from one floor of a restaurant to another floor is described in U.S. Pat. No. 7,708,135. The food transport system includes a conveyor that transports food-item supporting carriers along a closed-loop pathway defined by a belt or chain, to which the carriers are pivotably connected. Although the transport of food items placed on supporting carriers is convenient, the belt or chain-based conveyor system has less design flexibility in terms of space utilization and winding transport pathways.

US 2021/0094761 of the Applicant is also directed to a conveyor system for the transport of packaged food items in restaurants, etc., which allows a flexible design of layouts. This provides a track-based conveyor system with supporting carriers on which food items to be transported can be placed at a loading station. The food items are then transported to a customer delivery point which is remote from the loading station. Here, the packaged items are loaded onto the carriers at loading and unloading stations. In one preferred arrangement, the carriers are defined by baskets (carrier baskets) having a series of support fingers cantilevered from a single back support that is pivotally mounted to a car that can travel in a conveyor track. The carrier support fingers are aligned with spaces located between loading/unloading station support fingers or rollers. The entire content of US 2021/0094761 is incorporated herein by reference as if fully set forth.

Although the known arrangements have been successful in operation, there is an issue with the weight capacity of the carrier basket when loaded since the weight of the items being transported is transferred from the carrier basket to a single one of the wheeled cars to which the carrier is pivotally connected. Improved functionality in this regard is desired.

SUMMARY

The present disclosure is directed to a carrier basket support and stabilizing system for a carrier basket having increased weight carrying capacity that is transported along a conveyor having a pathway. The system includes a plurality of cars configured to travel along the pathway, with at least some support groups including two of the cars having a carrier basket support connected thereto. Each said support group of two of the cars includes a first car and a second car. The carrier basket support has a support plate connected to the first car via a pivoting connection and connected to the second car by a pivoting and sliding connection such that the first and second cars are pivotable relative to the support plate and a distance between the first car and the second car can change during traversal of curves along the pathway. A support connection is located on the support plate configured for connection to a carrier basket on a side facing away from the pathway. The carrier basket has a back support, a product support surface extending generally transversely from the back support in a direction opposite to the pathway, and a mating connection on the back support that is connected to the support connection.

With this arrangement, the carrier basket is supported by two of the cars, providing a greater weight capacity than in the prior known system where the carrier basket was supported by a single car. This arrangement also allows for a change in the distance between the first and second cars in the curves and to compensate for the changing angles of the cars relative to one another in a horizontal plane as they traverse inner and outer curves.

In one embodiment, a plurality of support rollers are located on the support plate, at least one of which is configured to contact the back support at a location spaced apart from the support connection.

In one embodiment, the support connection and the mating connection provide for pivoting movement between the carrier basket and the support plate, and two of the support rollers are in contact with the back support to receive cantilevered loads from articles loaded on the product support surface of the carrier basket.

In one embodiment, the pivoting connection between the first car and the support plate comprises a spherical ball joint supported on the support plate and a bolt connecting the first car to the spherical ball joint.

In one embodiment, the pivoting and sliding connection between the second car and the support plate comprises a spherical pillow block bearing connected to a side of the support plate facing the pathway, and a rod fastened to the second car that extends generally parallel to the pathway. The rod extends through the spherical pillow block bearing such that the second car can pivot relative to the support plate and move closer to or further from the first car by the rod sliding in the spherical pillow block bearing.

In one embodiment, the first car is the lead car and the second car is the trailing car.

In one embodiment, track guide rollers are located on a side of the support plate facing the pathway. These help to transfer cantilevered loads from the support plate to the track that defines the pathway.

In one embodiment, the support connection comprises a plurality of connection rollers, and the mating connection comprises a housing having a part circular track that encloses greater than 180°. The connection rollers are engaged in the part circular track such that the carrier basket is pivotable by gravity so the product support surface is maintained generally horizontal during movement of the carrier basket along the pathway.

In one arrangement, the pathway includes horizontal curved portions, and the first and second cars are configured to pivot relative to one another and the support plate as the support group of cars travels around the horizontal curved portions.

In one arrangement, the pathway includes vertical curved portions, and the first and second cars are configured to pivot relative to one another and the support plate as the support group of cars travels around the vertical curved portions.

In one embodiment, the system further includes a stabilizer bar connected to the first car and aligned generally perpendicular to a direction of the pathway, and stabilizer rollers are connected to the stabilizer bar spaced apart from the pivoting connection that are configured to contact a side of the support plate facing the pathway. This provides for additional load transfer capability between the support plate and the first car.

In a preferred embodiment, the product support surface comprises a plurality of spaced apart fingers.

In one embodiment, the cars include track rollers that are configured to ride on a track that defines the pathway.

In one embodiment, a flexible connector extending between the first and second cars.

The various features noted above can be used alone or in various combination with the support plate having the first and second cars connected thereto that provide the enhanced load carrying ability for a carrier basket by being connected to two of the cars.

BRIEF DESCRIPTION OF THE DRAWINGS

Further advantages and characteristics of the invention will become apparent by the below description of embodiments making reference to the accompanying drawings, in which.

DETAILED DESCRIPTION

Figure 1:
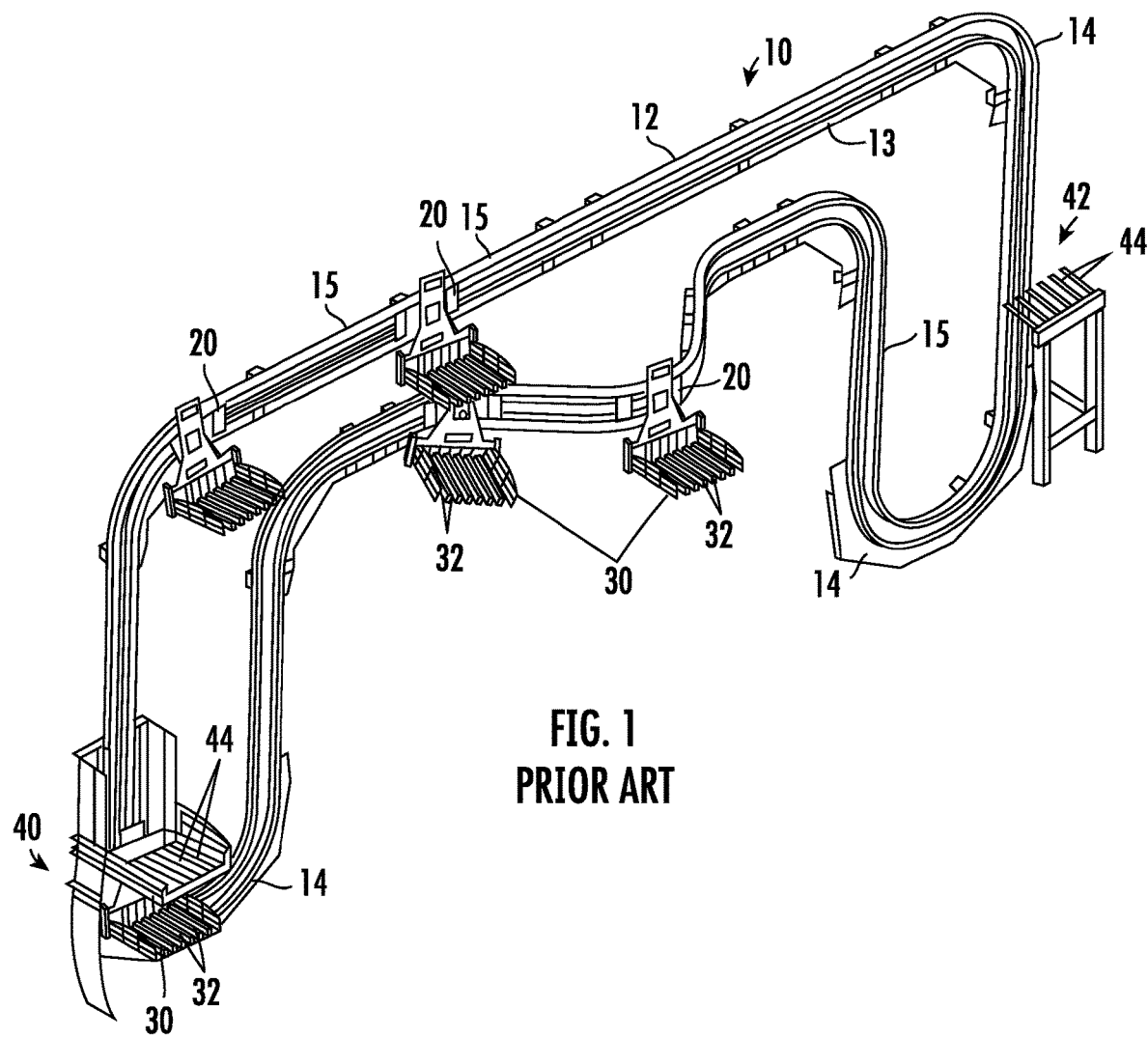
FIG. 1 is a perspective view of a prior art conveyor system of the Applicant that uses carrier baskets that are carried along the pathway defined by a track having cars that travel along the track, with each of the carrier baskets being supported by a respective single car.
Figure 2:
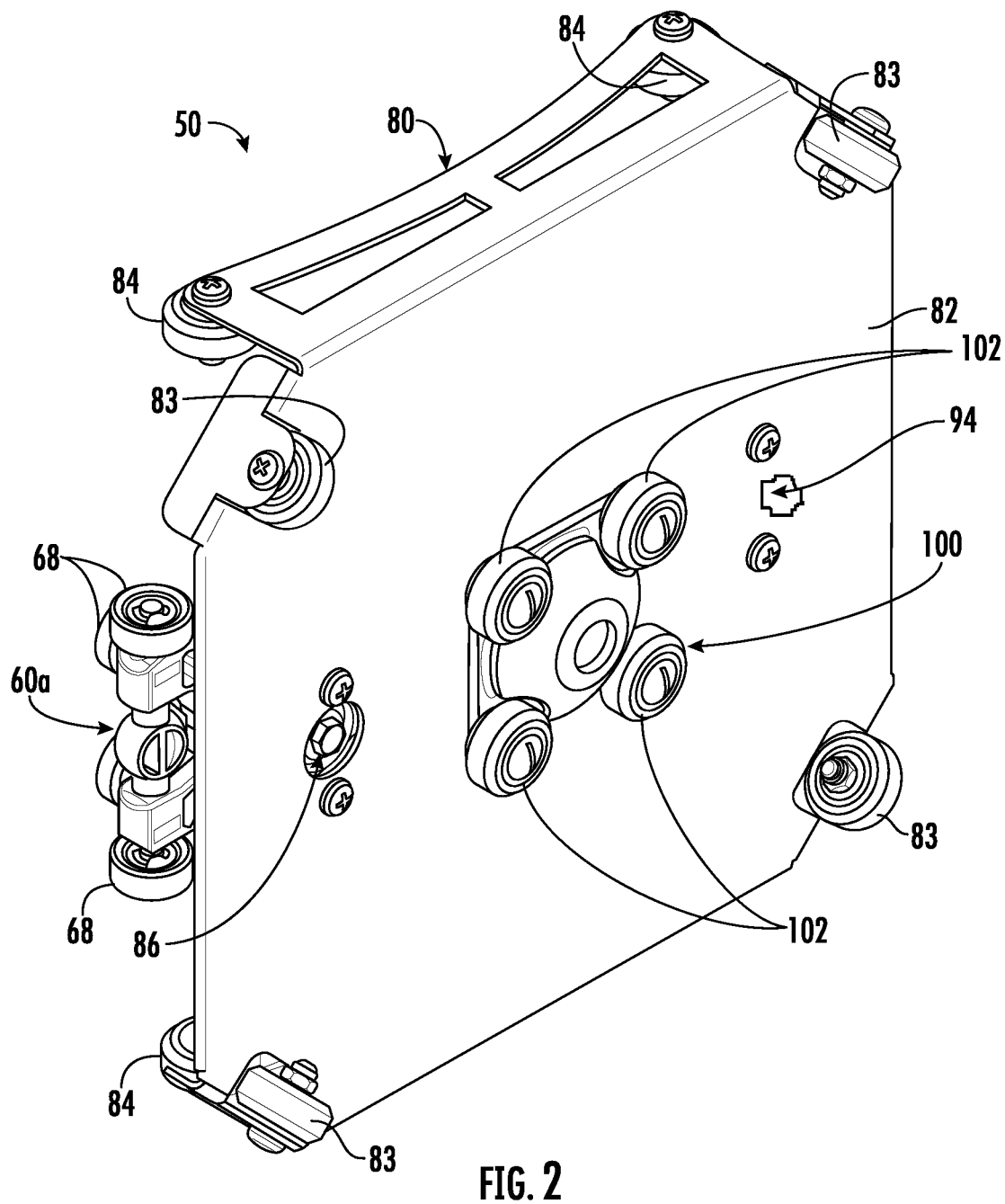
FIG. 2 is a perspective view of a carrier basket support according to the present disclosure that is configured to travel along the pathway defined by a track that is supported by two of the cars that travel along the pathway to provide increased load carrying capability.
Figure 3:
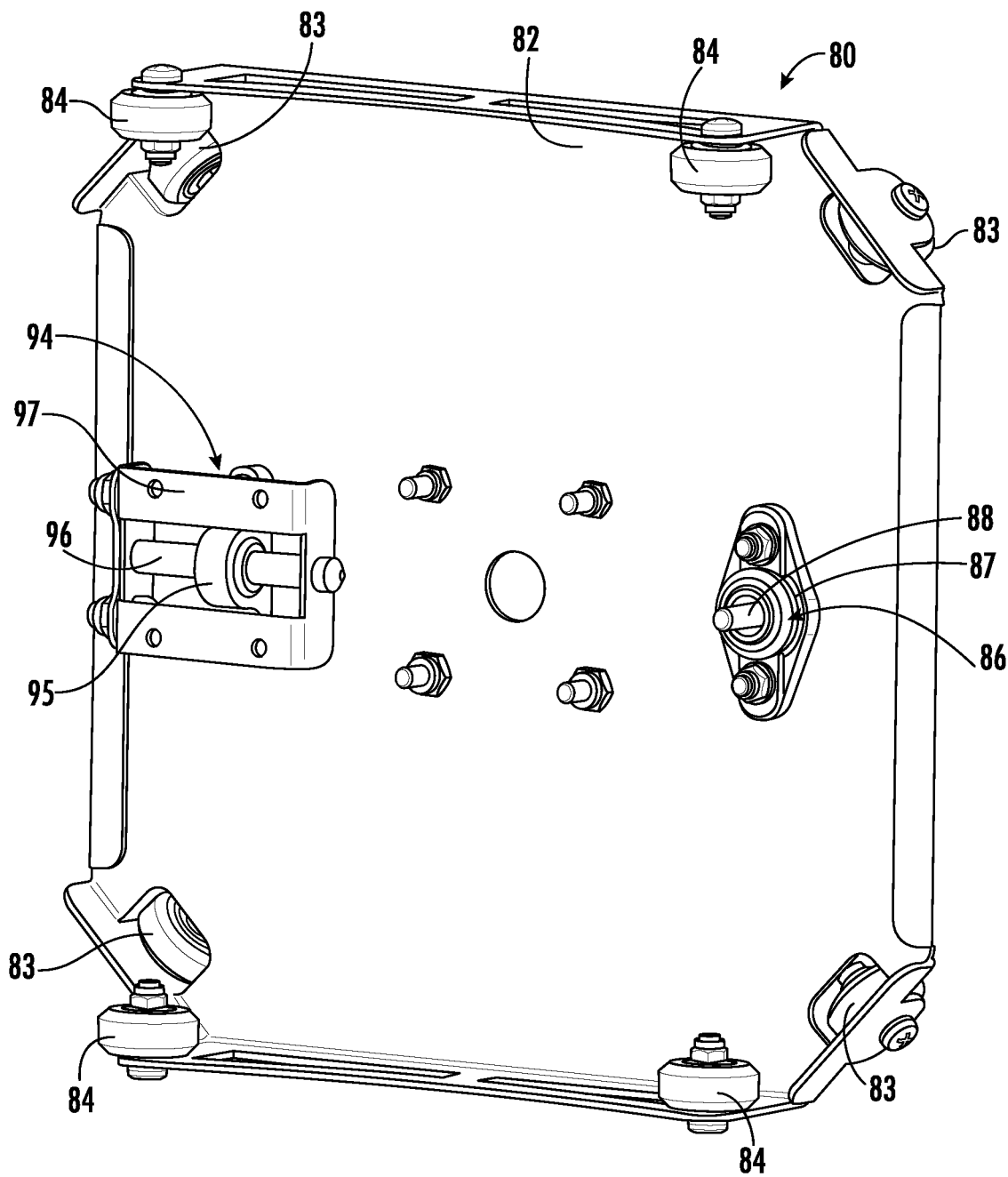
FIG. 3 is a rear perspective view showing details of the support plate for the carrier basket support shown in FIG. 2 with connections for two of the cars being illustrated.
Figure 4:
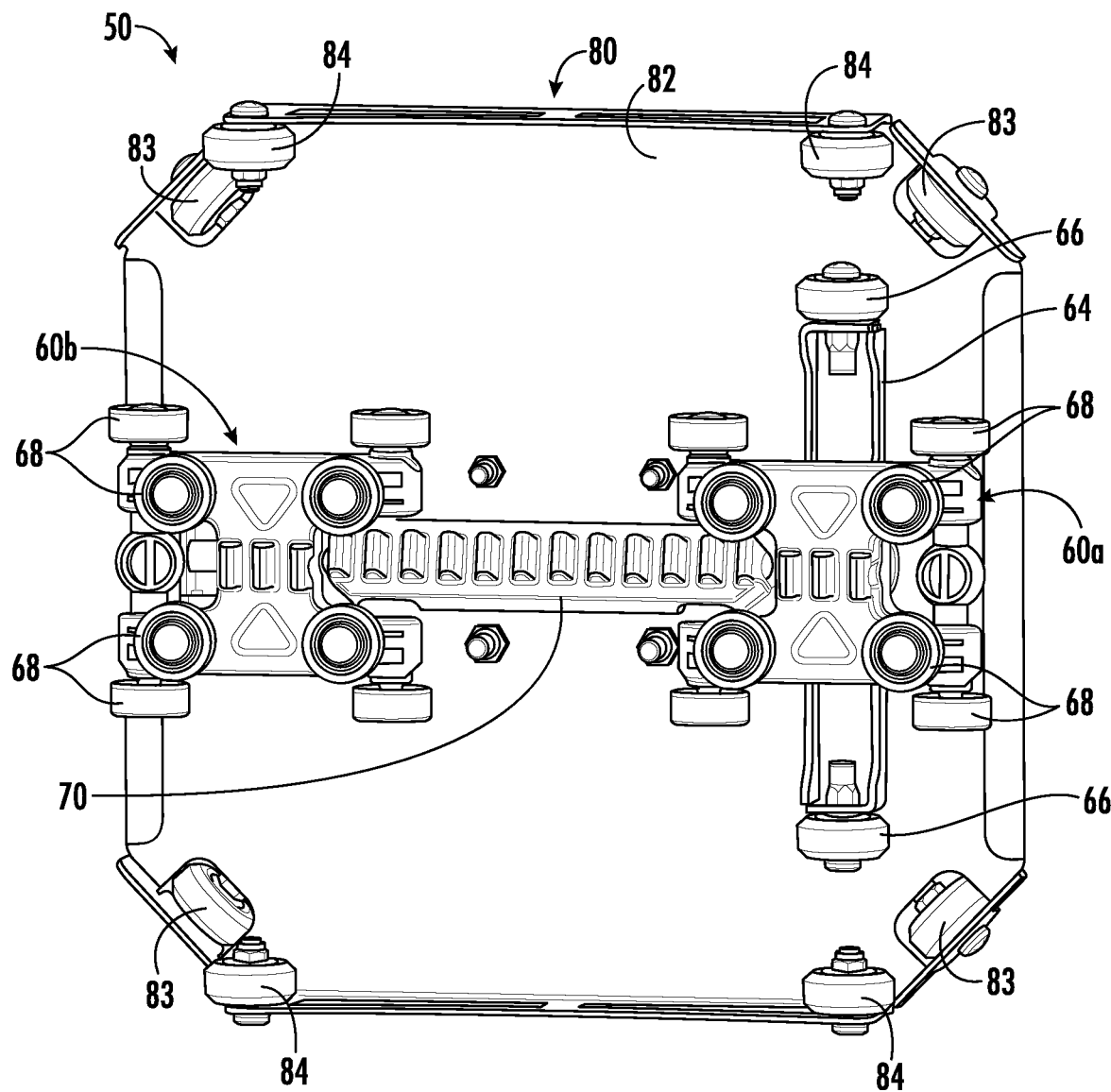
FIG. 4 is a rear view of the carrier basket support shown in FIGS. 2 and 3 with two of the cars connected to the support plate.
Figure 5:
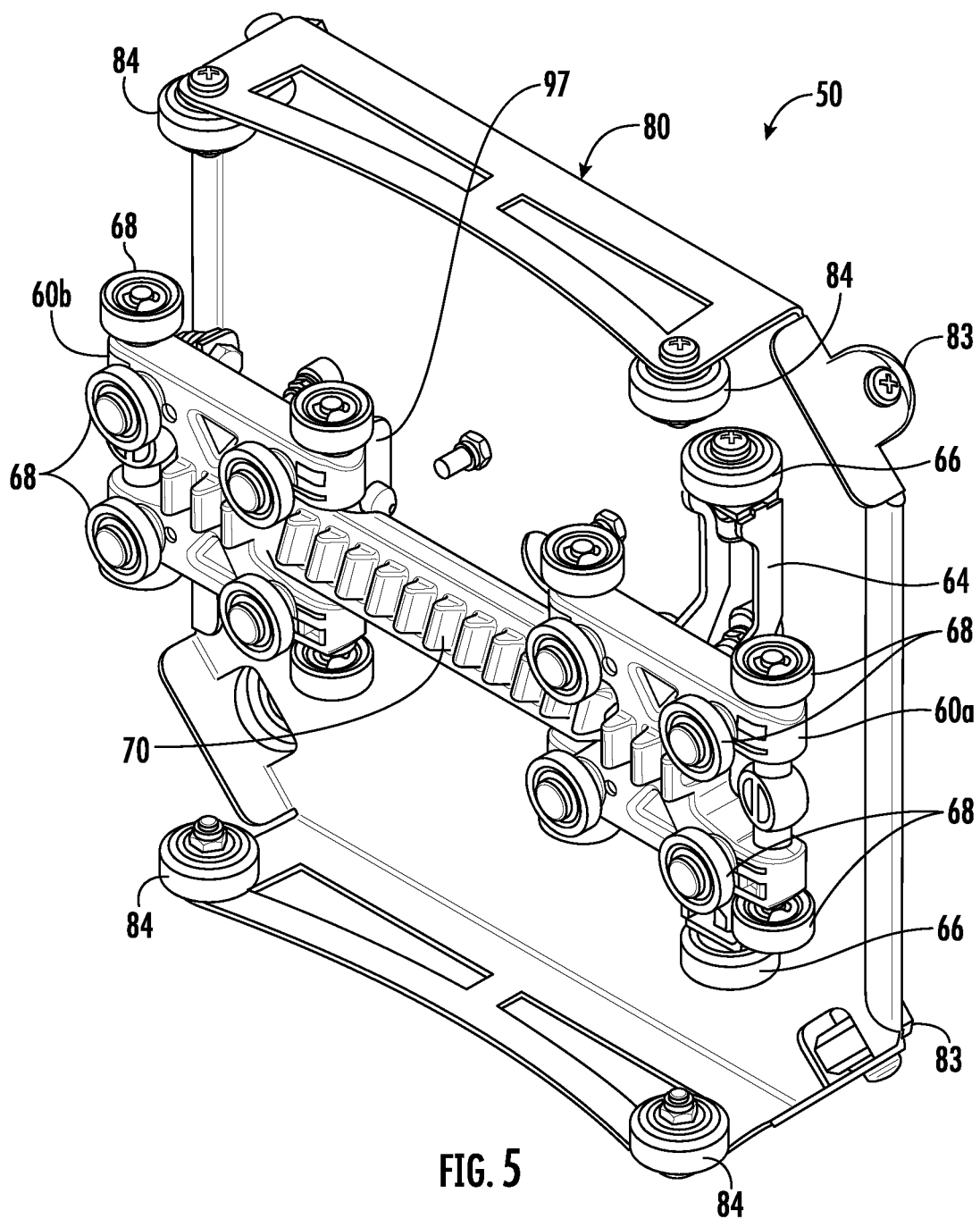
FIG. 5 is a perspective view similar to FIG. 4 showing the carrier basket support with two of the cars connected to the support plate.
Figure 6:
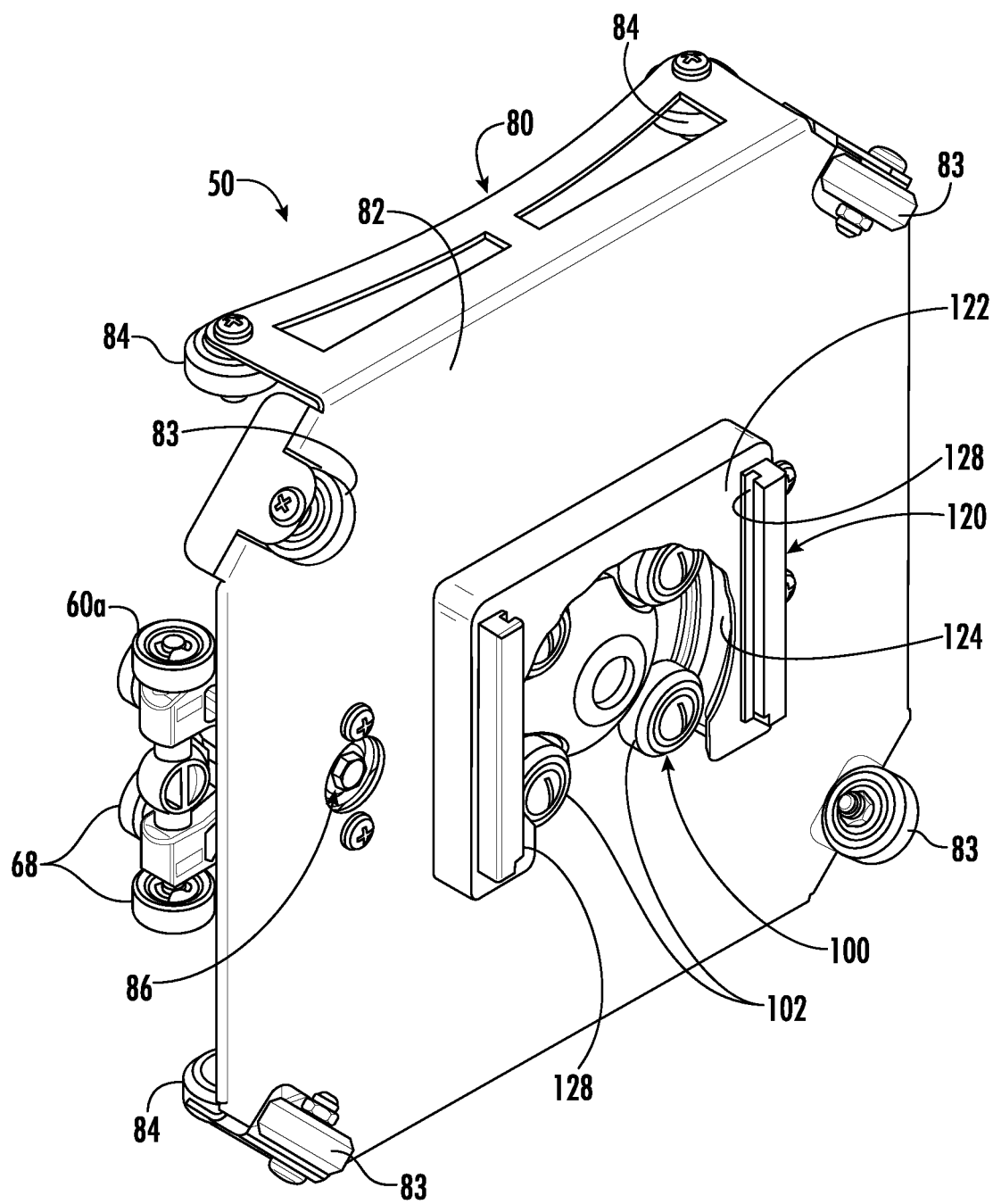
FIG. 6 is a front perspective view showing the carrier basket support of FIG. 5 with the support connection on the support plate for connection to a carrier basket as well as the mating connection that is configured to be connected to the back support of the carrier basket.

Certain terminology is used in the following description for convenience only and is not limiting. The words "right," "left," "top," and "bottom" designate directions in the drawings to which reference is made. The words "a" and "one," as used in the claims and in the corresponding portions of the specification, are defined as including one or more of the referenced item unless specifically stated otherwise. This terminology includes the words above specifically mentioned, derivatives thereof, and words of similar import. The phrase "at least one" followed by a list of two or more items, such as "A, B, or C," means any individual one of A, B or C as well as any combination thereof. The terms approximately or generally mean within +/−10% of a specified value unless otherwise noted, and within +/−25° of a specified angle or direction.

FIG. 1 is a view showing an embodiment of Applicant's conveyor system 10 from U.S. 2021/0094761, which is incorporated herein by reference as if fully set forth. This includes a pathway 12 defined by a track 13 having one or more curved portions 14 as well as straight segments 15 in which a plurality of cars 20 are guided. A motor drives the cars 20 along the track 13 either via having the cars 20 directly linked to one another or having intermediate portions located between the cars 20. A carrier basket 30 is pivotally mounted to at least some of the cars, with the carrier basket 30 including carrier support fingers 32 that are cantilevered from a side of the carrier basket 30 that is pivotally mounted to the cars 20. At least one of a loading station 40 or an unloading station 42 is preferably located along the pathway 12. The loading and unloading stations 40, 42 include support fingers 44 that are used to remove an item being transported from the carrier basket 30 by the carrier basket support fingers 32 moving between the loading or unloading station support fingers 44 to either pick-up or drop-off the item being transported via the conveyor system 10. These support fingers 44 can be powered, i.e., formed by powered rollers, belts or chains, in order to further carry the item along a transport or delivery path. As discussed in U.S. 2021/0094761, the conveyor system 10 allows enhanced flexibility for the design of layouts in order to suit particular applications and space requirements.

Referring to FIGS. 2-19, an embodiment of a carrier basket support and stabilizing system 50 for a carrier basket 110 to provide increased weight carrying capacity is shown. The carrier basket support and stabilizing system 50 is for use in connection with a carrier basket transporter 52 that includes a conveyor 54 (see FIGS. 7-11 and 13-18), similar to the conveyor system 10 disclosed in FIG. 1, that has a pathway 56 along which the carrier baskets 110 are carried. The pathway 56 is defined by tracks 57, similar to the track 13 discussed above, that can be arranged in various configurations having curved portions 58, 59 as well as straight segments in order to move products, which can be for example fast food, that is placed in the carrier basket 110, preferably between loading and unloading stations, such as 40 and 42 shown in FIG. 1.

Figure 7:
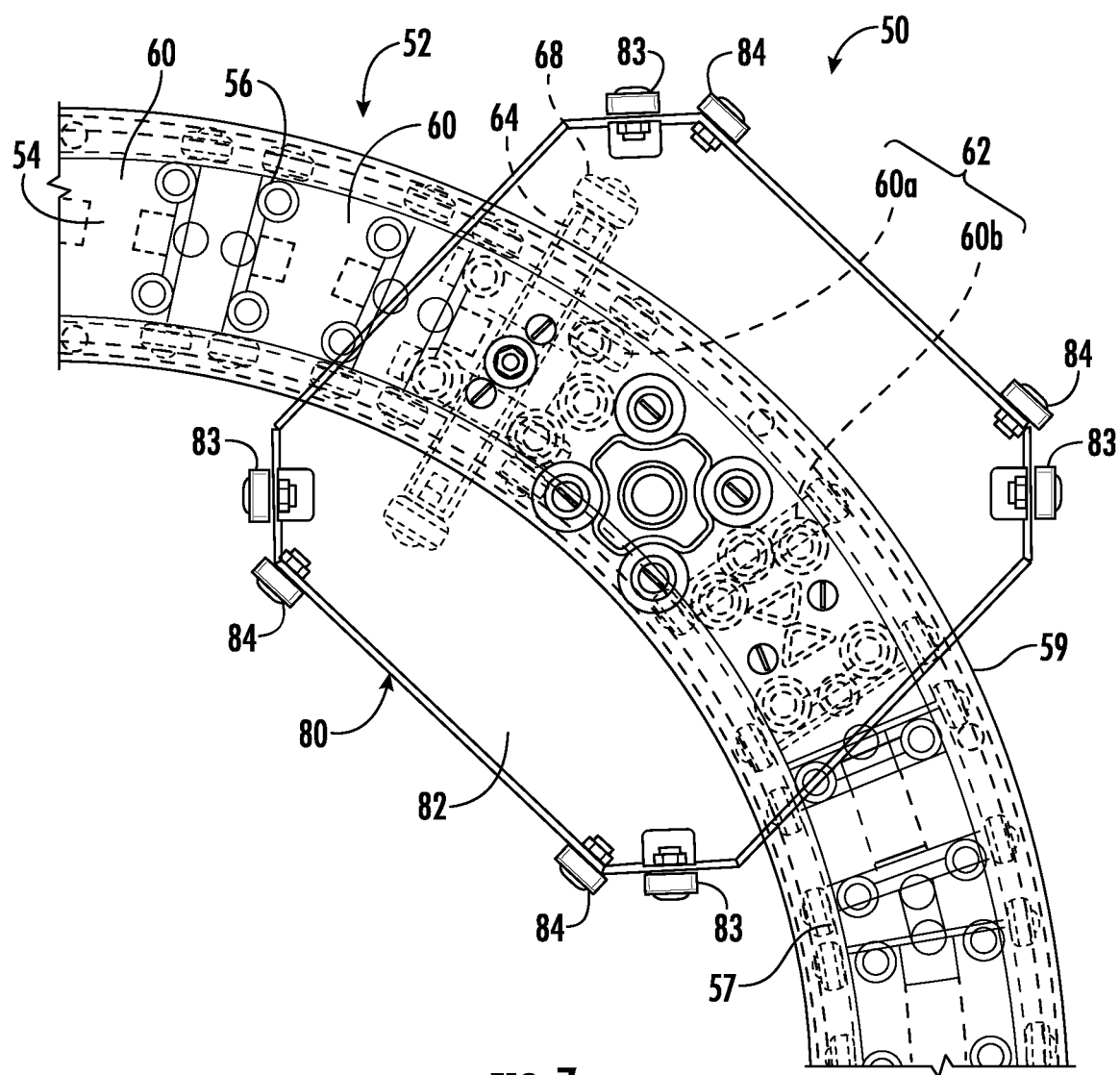
FIG. 7 is a view of a portion of the carrier basket transporter including a conveyor with a pathway showing the carrier basket support and stabilizing system's support plate connected to two of the cars traveling along the pathway.
Figure 8:
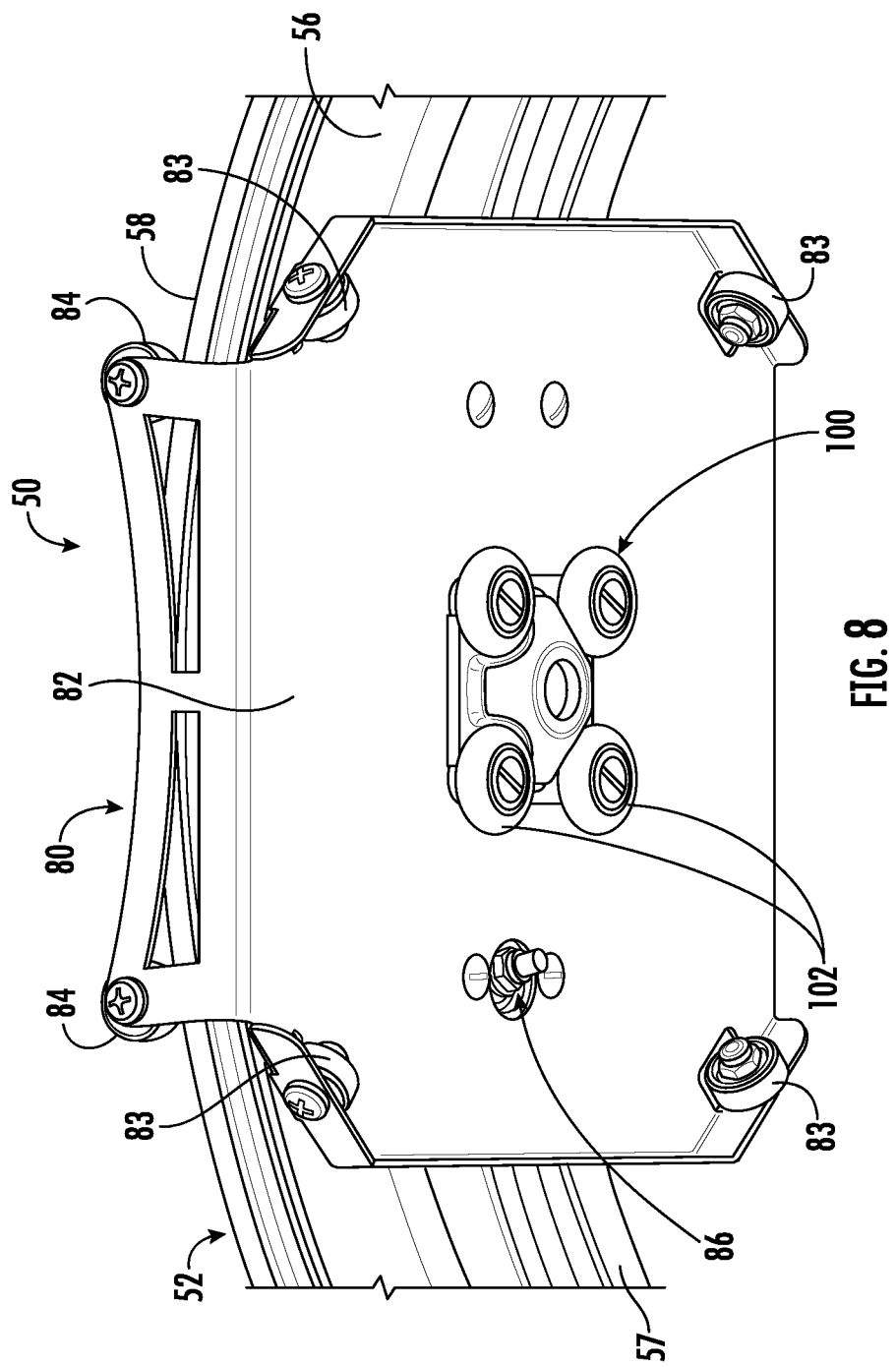
FIG. 8 is a perspective view showing the carrier basket support traversing an inside horizontal curve along the pathway.
Figure 9:
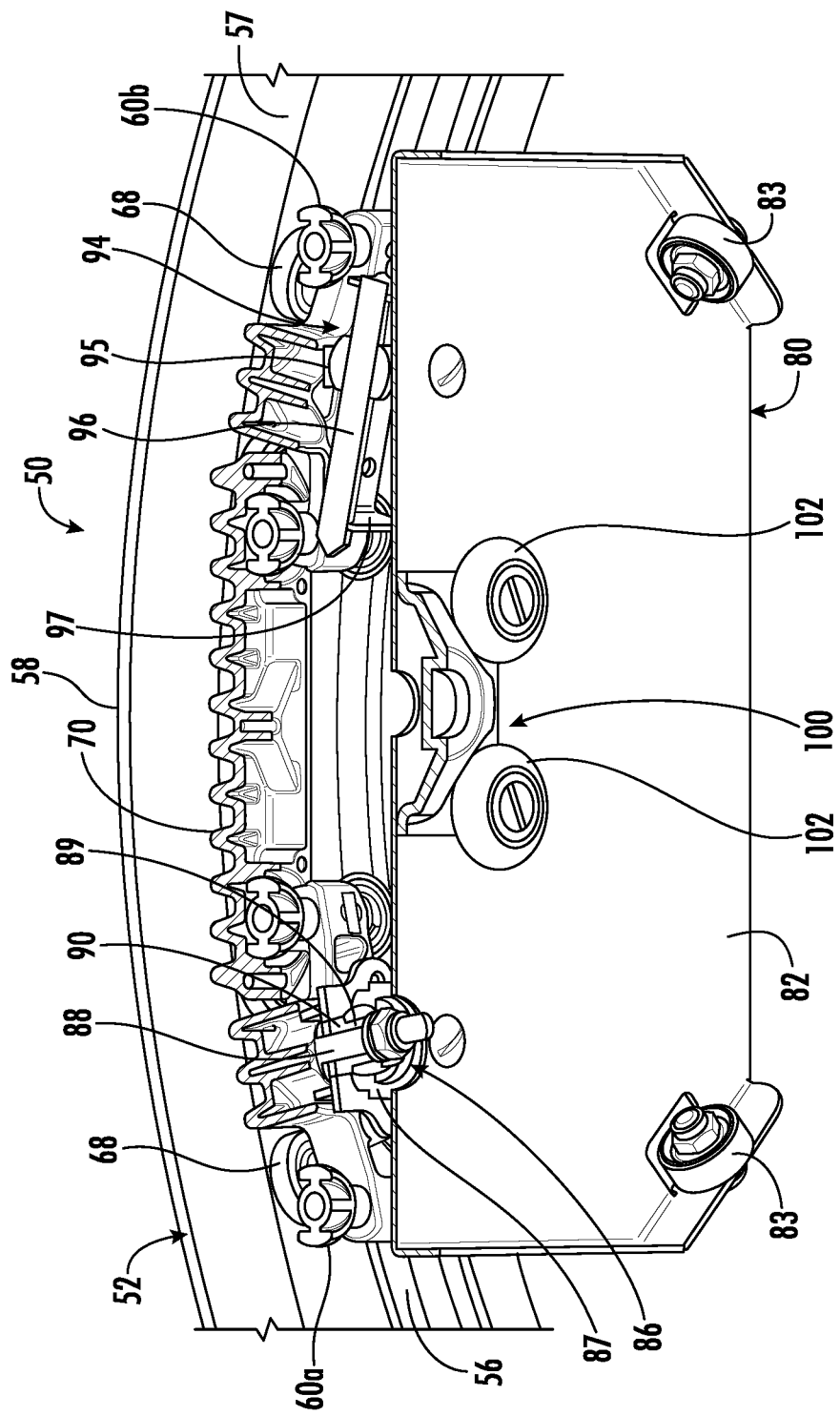
FIG. 9 is a perspective view, in cross-section, similar to FIG. 8 showing in detail the pivoting connection between the first car and the support plate and the pivoting and sliding connection between the second car and the support plate, as well as the engagement of the cars in the track that forms the pathway via track rollers connected to the cars.
Figure 10:
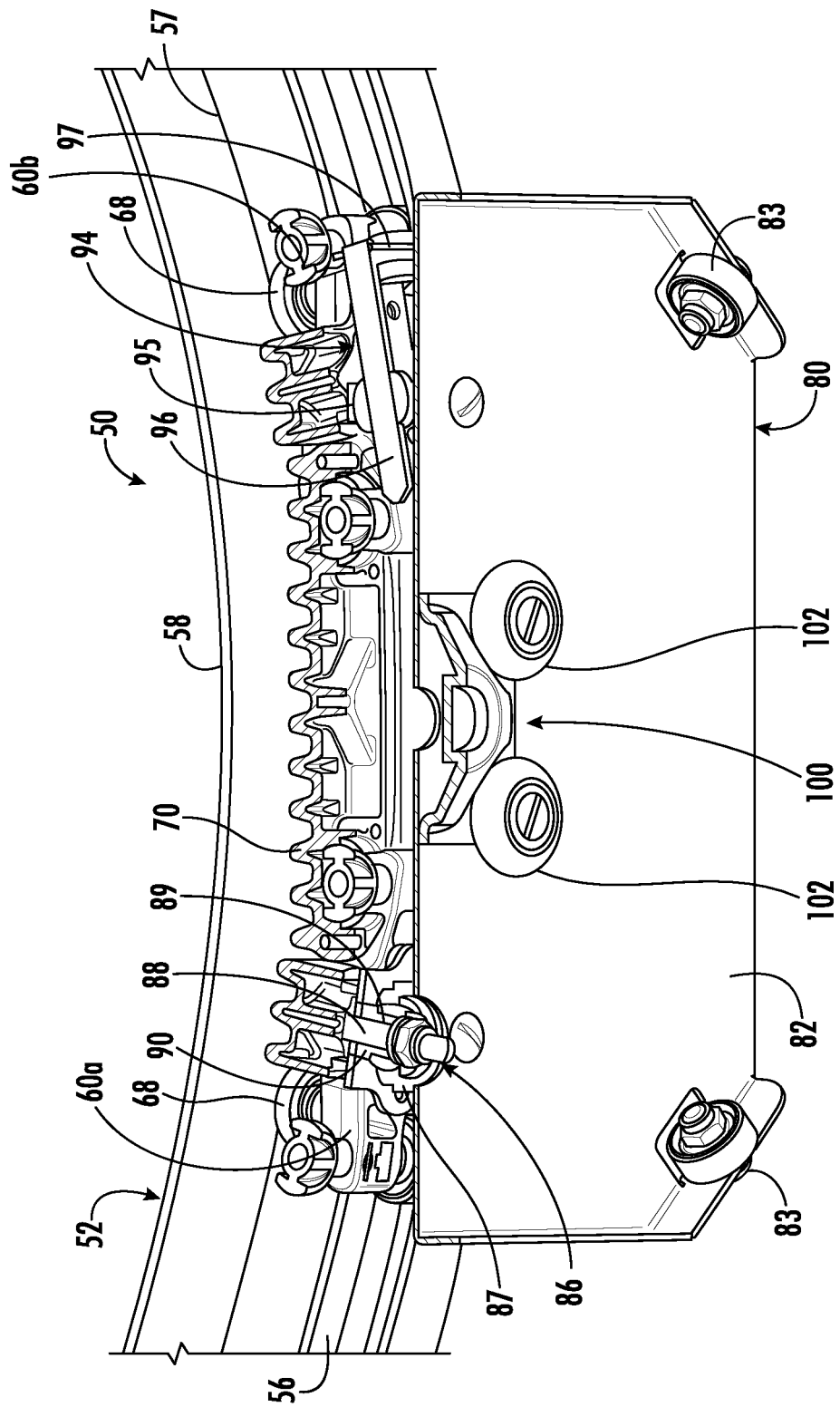
FIG. 10 is a perspective view, partially in cross-section, similar to FIG. 9, showing the carrier basket support that is connected to two of the cars traversing an outside horizontal curve along the pathway.
Figure 11:
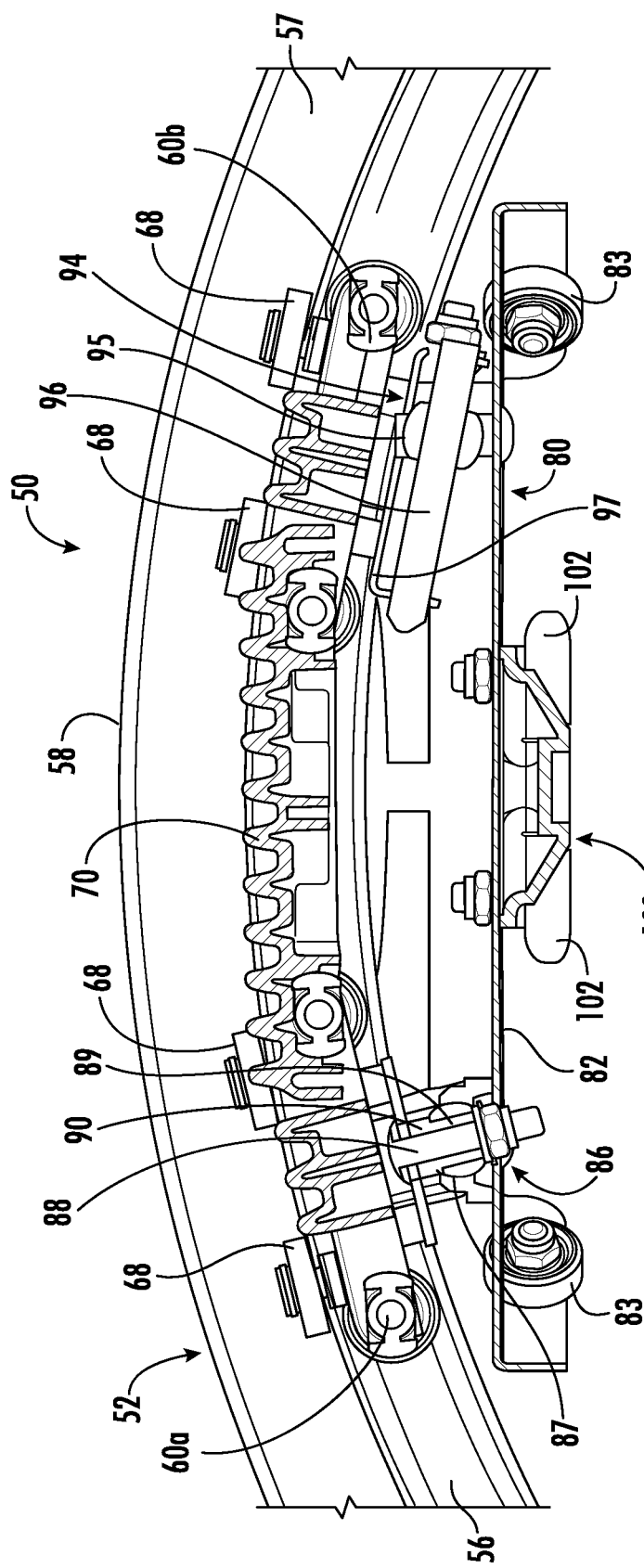
FIG. 11 is a top view of the arrangement shown in FIG. 9.
Figure 12:
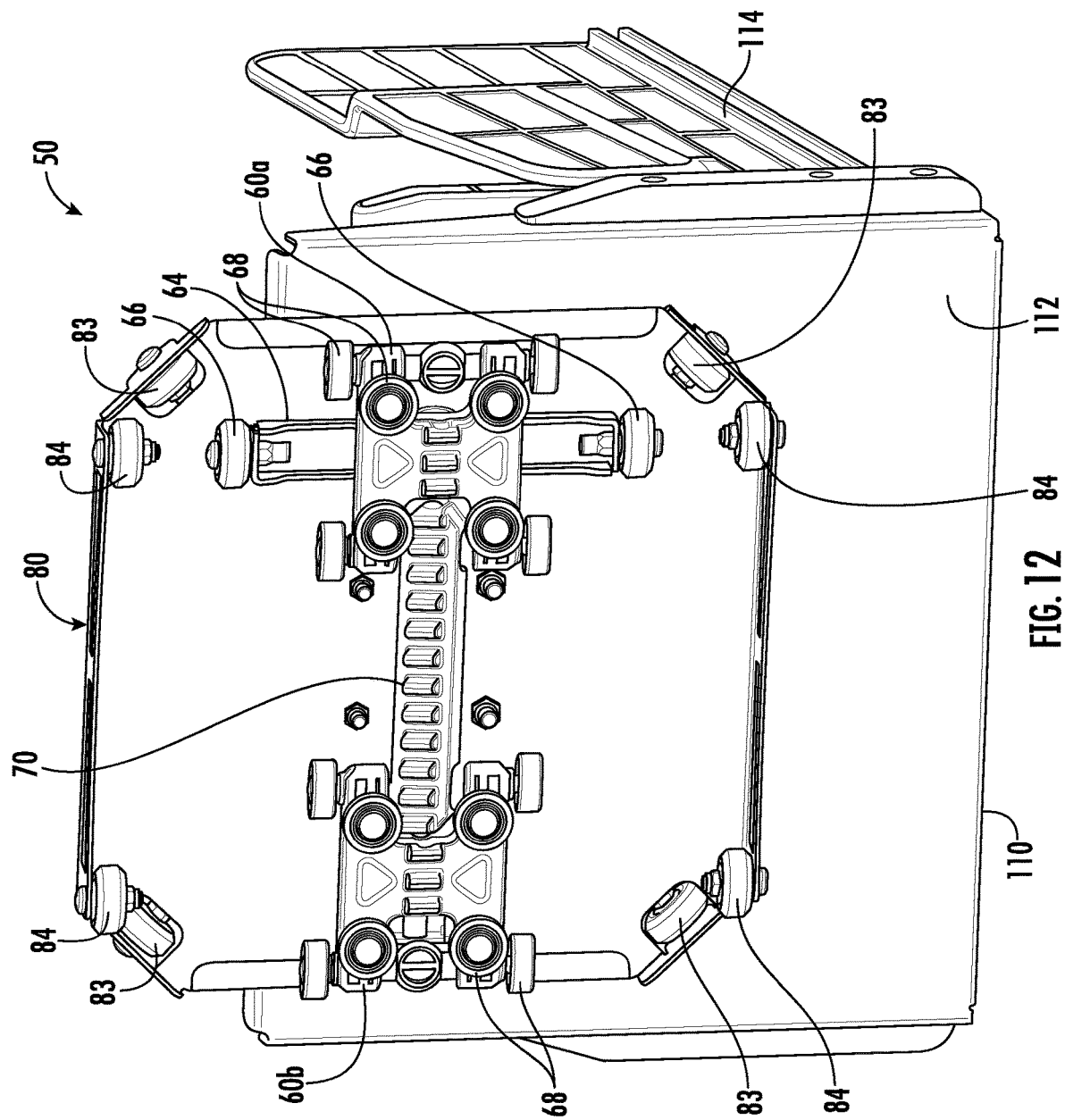
FIG. 12 is a perspective view showing the carrier basket support connected to a carrier basket detailing the side of the carrier basket support that faces the pathway.
Figure 13:
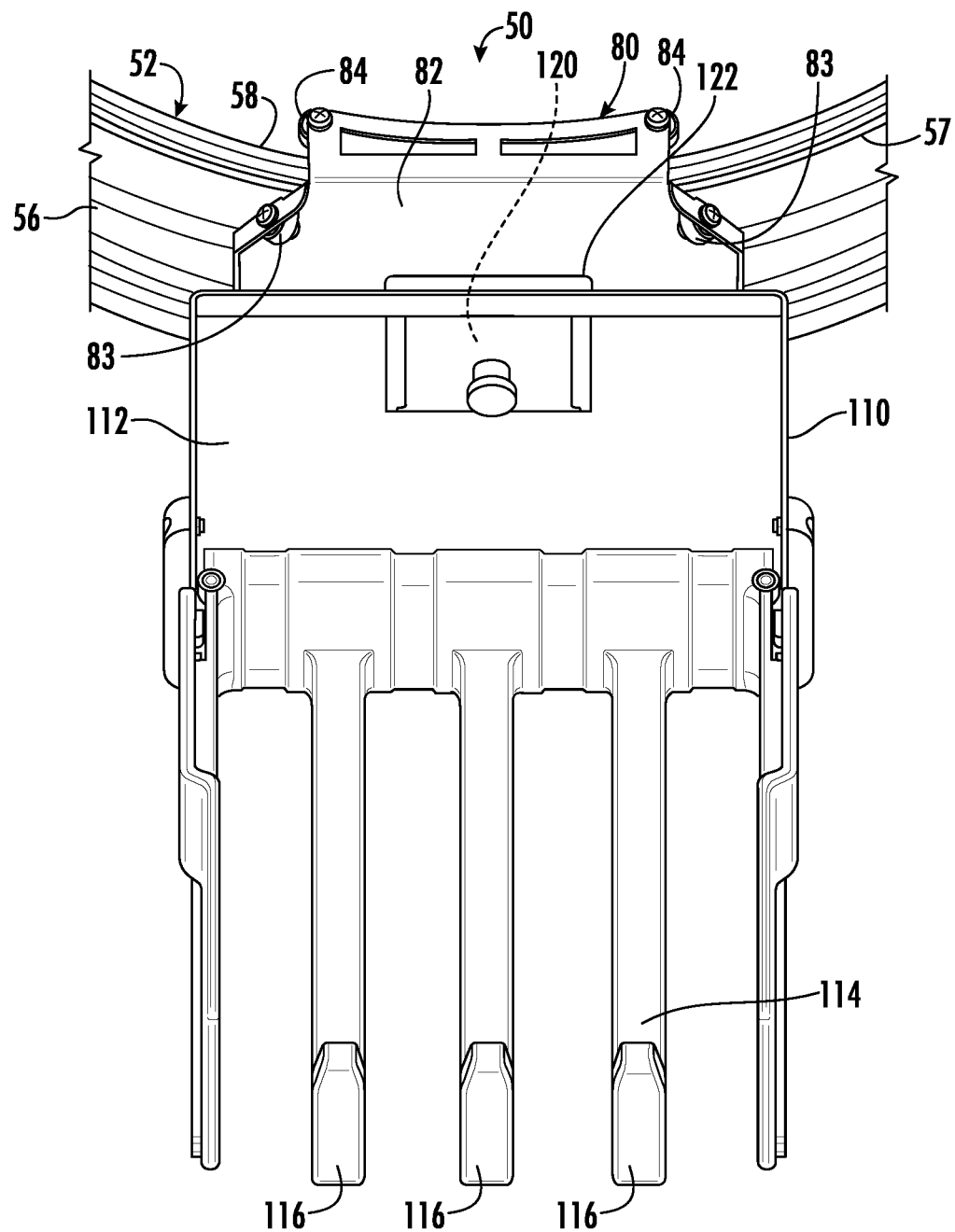
FIG. 13 is a perspective view showing the carrier basket support along with a carrier basket supported thereon traversing an outside horizontal curve along the pathway.
Figure 14:
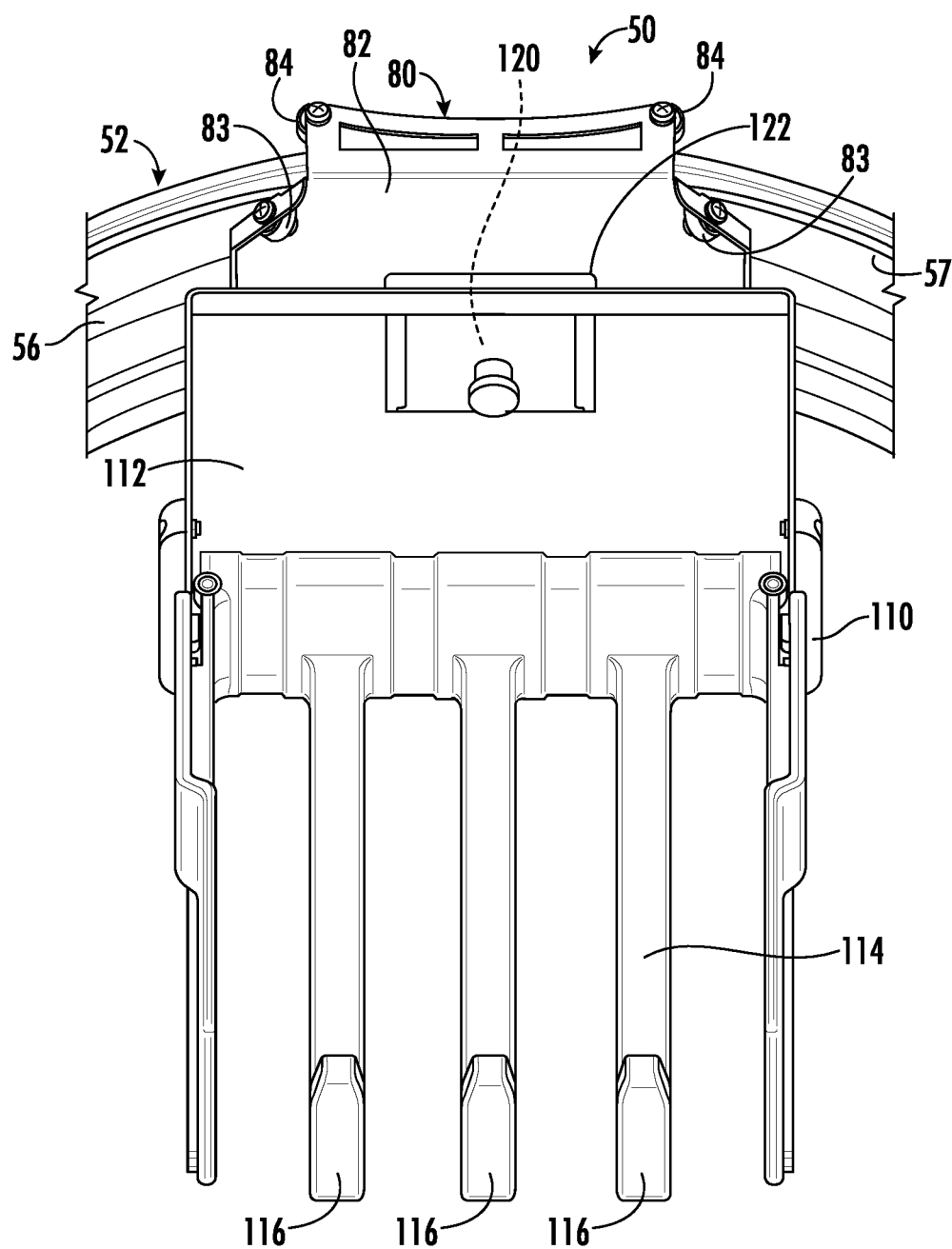
FIG. 14 is perspective view similar to FIG. 13 showing the carrier basket support along with a carrier basket located thereon traversing an inside horizontal curve along the pathway.
Figure 15:
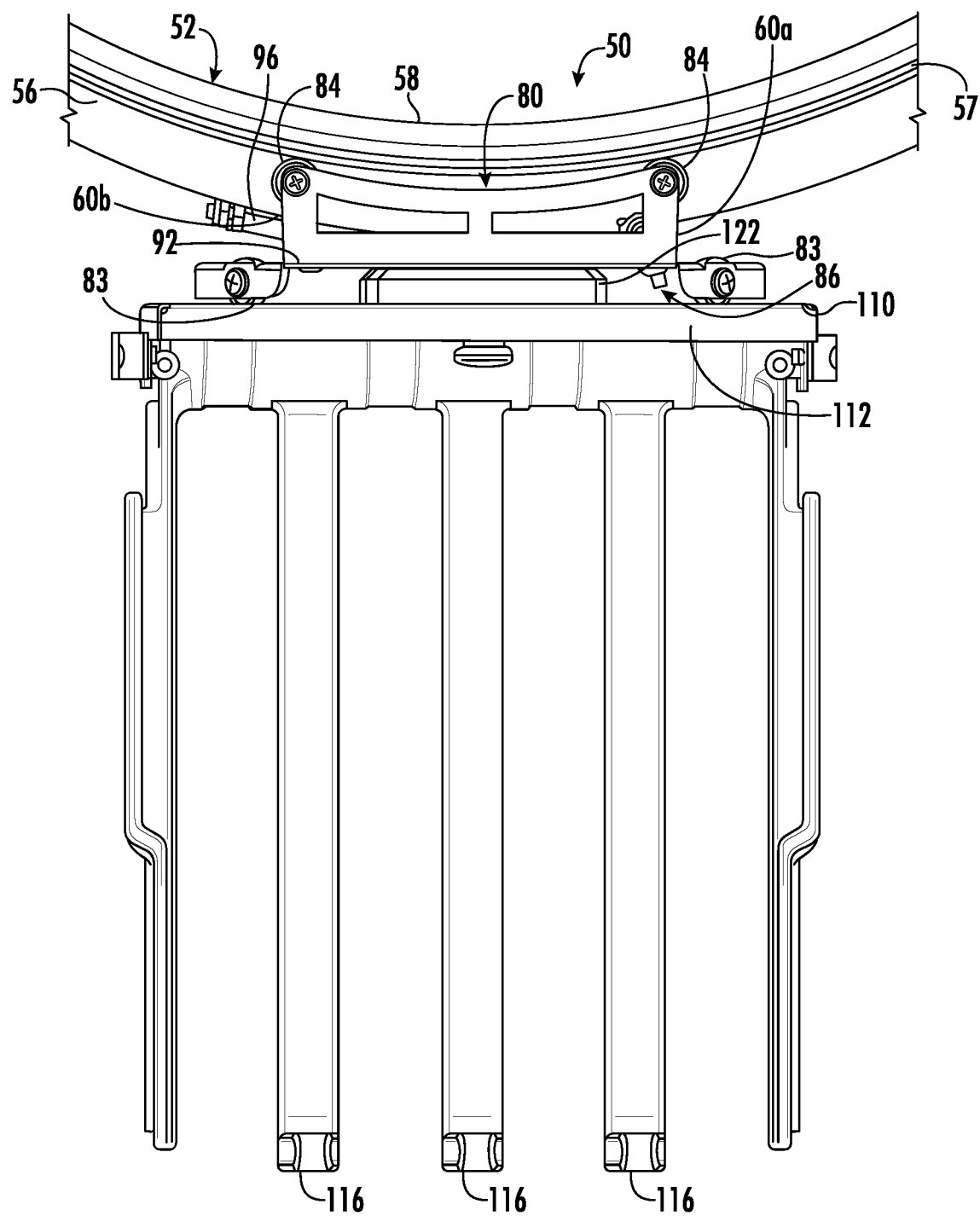
FIG. 15 is a top view of the arrangement shown in FIG. 13.
Figure 16:
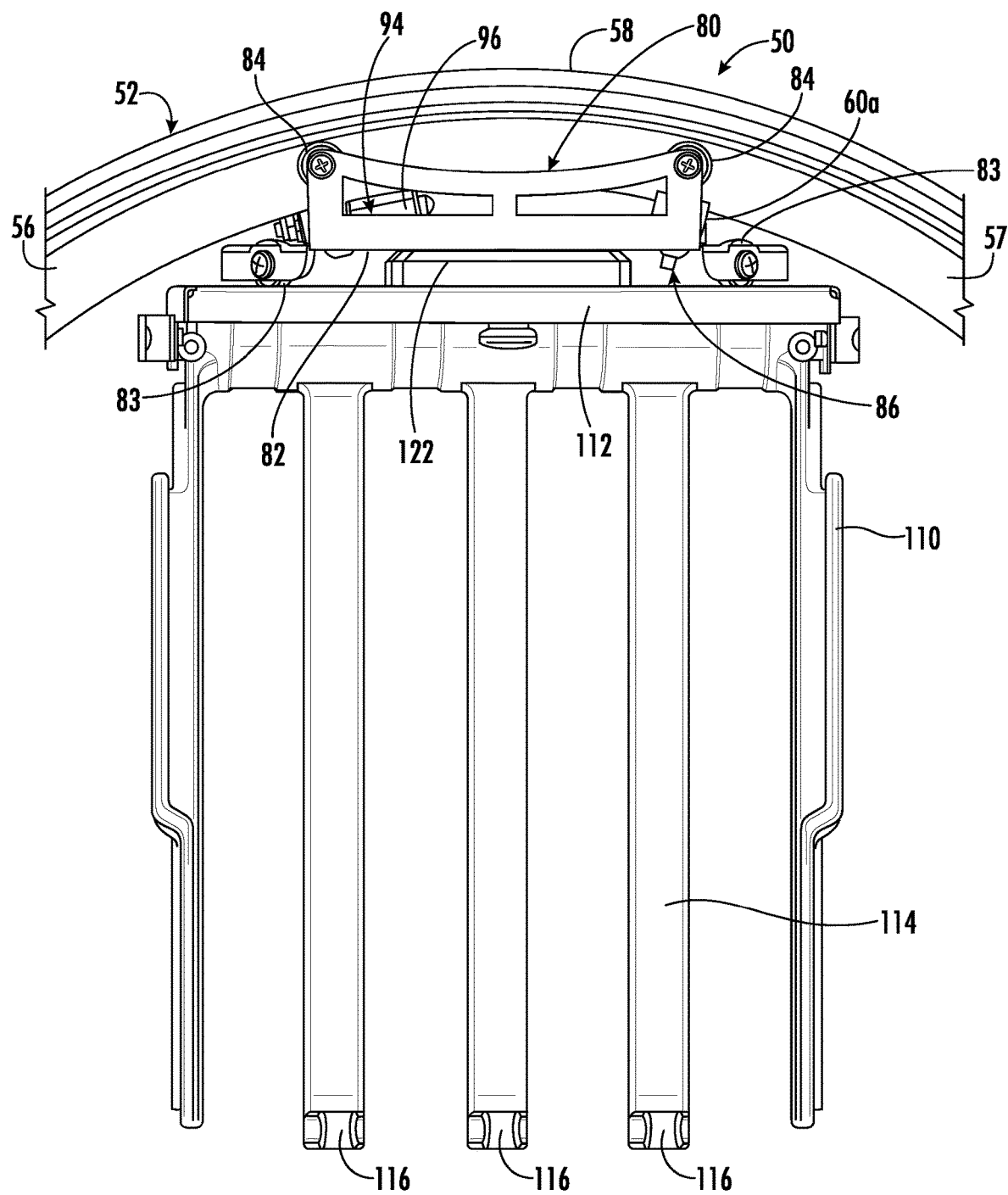
FIG. 16 is a top view of the arrangement shown in FIG. 14.

In accordance with the present system 50, as shown in FIGS. 2-7 as well as 9-12, a plurality of cars 60 are configured to travel along the pathway 56 (see FIG. 7). At least some support groups 62 for each carrier basket 110 include two of the cars 60a, 60b that have a carrier basket support 80 connected thereto. Each support group 62 of two of the cars 60 includes a first car 60a and a second car 60b. These are shown most clearly in FIGS. 4, 5, 7, and 9-11. The cars 60, 60a, 60b preferably include track rollers 68 that are configured to ride on the track 57 that defines the pathway 56.

In order to support a heavier weight for the carrier basket 110, the carrier basket support 80 includes a support plate 82 that is connected to the first car 60a via a pivoting connection 86 and connected to the second car 60b by a pivoting and sliding connection 94 such that both cars 60a, 60b can pivot relative to the support plate 82 and a distance between a first car 60a and a second car 60b can change during traversal of curves along the pathway 56, for example as shown in FIGS. 7 and 9-17.

As shown in detail in FIGS. 3 and 9-11, the pivoting connection 86 between the first car 60a and the support plate 82 preferably comprises a spherical ball joint 87 that is supported on the support plate 82, for example, it can be screwed or bolted thereon, as well as a bolt 88 (a bolt can refer to a threaded fastener or a pin) that connects the first car 60a to the spherical ball joint 87. As can be seen in particular in FIGS. 9 and 10, the spherical ball joint 87 has an opening defined therethrough and the bolt 88 extends through the opening, preferably inside a bushing 89 that has a collar or shoulder 90 that spaces the spherical ball of the spherical ball joint 87 from a connecting surface of the first car 60a in order to allow nonbinding pivoting movement. In the exemplary embodiment shown, a nut is engaged with the bolt in order to clamp the bushing 89 and spherical ball of the spherical ball joint 87 against a mounting surface on the first car 60a by tightening the nut onto the end of the bolt 88. The bolt 88 can be accessed through a clearance opening in the support plate 82. While this type of pivoting connection is one exemplary embodiment, other types of pivoting connections could be used.

Still with reference to FIGS. 3 and 9-11, the pivoting and sliding connection 94 between the second car 60b and the support plate 82 comprises a spherical pillow block bearing 95 which can be, for example, attached via screws or bolts to the support plate 82, on a side of the support plate 82 faces the pathway 56. A rod 96 that is fastened to the second car 60b, preferably via a bracket 97, extends generally parallel to the pathway 56, and the rod 96 extends through the spherical pillow block bearing 95 such that the second car 60b can pivot relative to the support plate 82 via movement of the spherical ball of the spherical pillow block bearing 95, and can also move closer to or further from the first car 60a by the rod 96 sliding in the opening that extends through the spherical ball of the spherical pillow block bearing 95.

As shown in detail in FIGS. 4, 5, and 9-11, a flexible connector 70 extends between the first car 60a and the second car 60b. This can be formed of a polymeric material, and may have a form with undulations in order to allow flexing and compression or expansion as a distance between the first and second car 60a, 60b changes as the group 62 with the two of the cars 60a, 60b and the carrier basket support 80 traverse horizontal and/or vertical curves 58, 59 along the pathway 56.

In order to provide further support, preferably a plurality of support rollers 83, preferably at least 3 and more preferably four, are located on the support plate 82, at least one of which is configured to contact the back support 112 at a location spaced apart from the support connection 110. More preferably, two of the support rollers 83 are in contact with the back support 112 to support cantilevered loads from articles 111, shown schematically in FIG. 16, that are loaded on the product support surface 114 of the carrier basket 110. In the illustrated embodiment, the support rollers 83 are located at the corners of the support plate 82. This ensures that at least two of the support rollers 83 contact the back support 112 regardless of the pivoted position of the carrier basket 110 as it moves along the pathway 56.

As shown in detail in FIGS. 2-6, 8 and 12-16, track rollers 84 are preferably located on a side of the support plate 82 facing the pathway 56. These track guide rollers 84 are spaced apart from the main portion of the track 57 and are adapted to contact a bottom rail and/or a top rail located along the track in order to maintain the support plate 82 generally vertically aligned as it moves along the pathway 56 and receive loads from the carrier basket 110 which can be transferred into the support plate 82 via the support rollers 83 on the support plate 82 contacting the back support 112 of carrier basket 110.

Referring now to FIGS. 2, 6, and 12-18, a support connection 100 is located on the support plate 82 and is configured to connection to the carrier basket 110 on a side facing away from the pathway 56. The carrier basket 110 includes a back support 112 as well as a product support surface 114 extending generally normal to the back support 112 in a direction opposite to the pathway 56. A mating connection 120 is located on or otherwise connected to the back support 112 and is connected to the support connection 100 on the support plate 82. The support connection 100 and the mating connection 120 provide for pivoting movement between the carrier basket 110 and the support plate 82.

Referring to FIGS. 2, 5, 6, and 19, in one embodiment the support connection 100 includes a plurality of connection rollers 102, and the mating connection 120 comprises a housing 122 having a part circular track 124 that enclosing greater than 180°, and more preferably encloses approximately 270°. The connection rollers 102 are engaged in the part circular track 124 such that the carrier basket 110 is pivotable by gravity by the connection rollers 102 allowing the part circular track 124 to roll thereon so that the product support surface 114 is maintained generally horizontal during movement of the carrier basket 110 along the pathway 56. The connection rollers 102 which are fixed relative to the support plate 82 providing for low resistance support of the part circular track 124 in the housing 122 thereon. The housing 122 is connected to or formed as part of the back support 112. Preferably there are a minimum of three of the connection rollers 102, and more preferably there are four of the connection rollers 102 arranged to define a circular support that generally corresponds to the circular track 124. The circular track 124 preferably includes a lip 126 that extends radially inwardly so that it is held in position on the connection rollers 102. In a preferred embodiment, the housing 122 is formed separate from and includes a grooved connection 128 that is engageable with a corresponding structure on the back support 112 of the carrier basket 110.

Other types of pivoting connections could also be provided between the support plate 82 and the back support 112 of the carrier basket 110, such as a single pin pivot support with a pin extending from one of the parts being received in an opening in the other of the parts. The opening could be defined as a simple slot, or could be in the form of a bearing to reduce friction.

Figure 17:
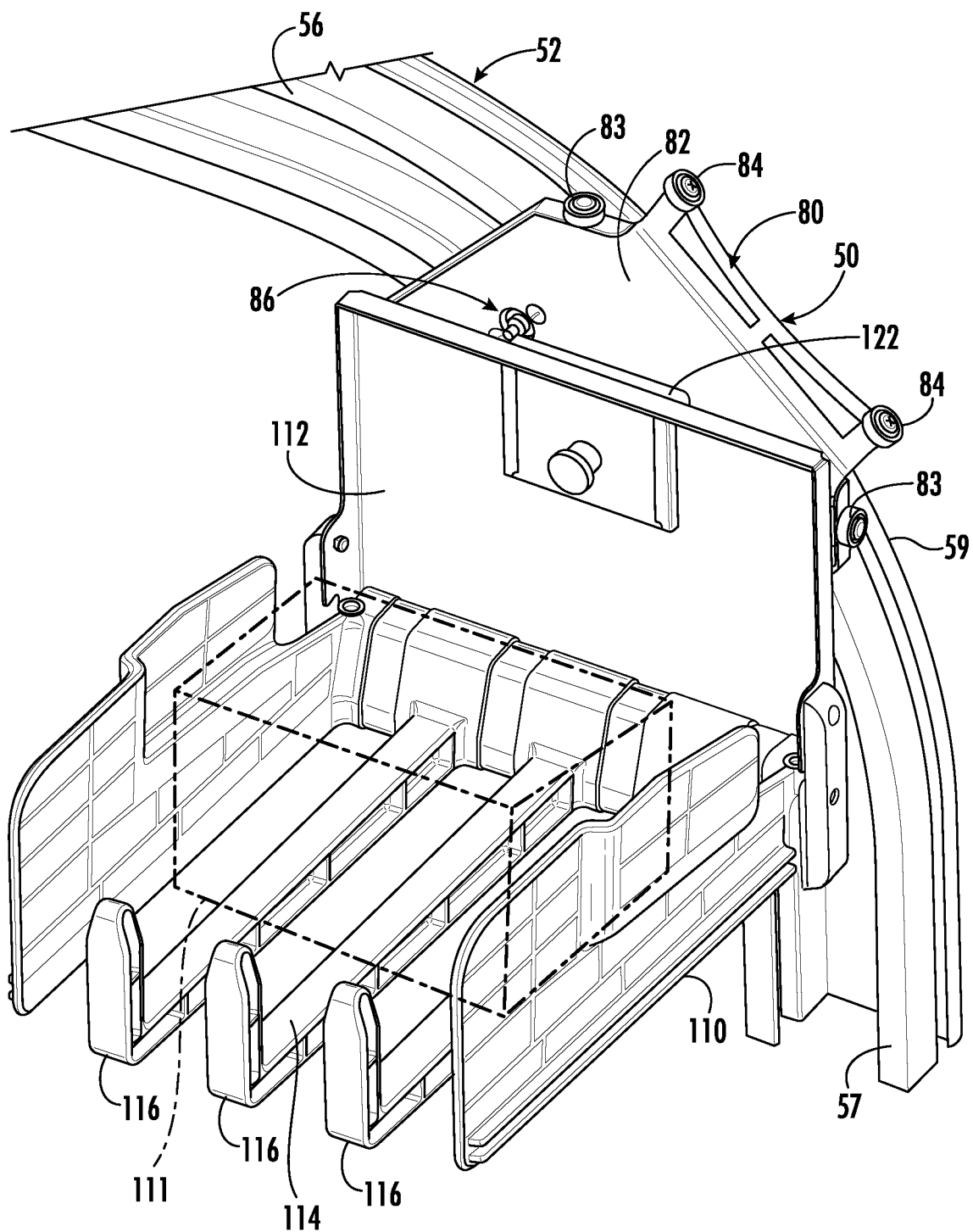
FIG. 17 is a perspective view showing the carrier basket support along with a carrier basket supported thereon traversing a vertical curve along the pathway defined by a conveyor of the carrier basket transporter.
Figure 18:
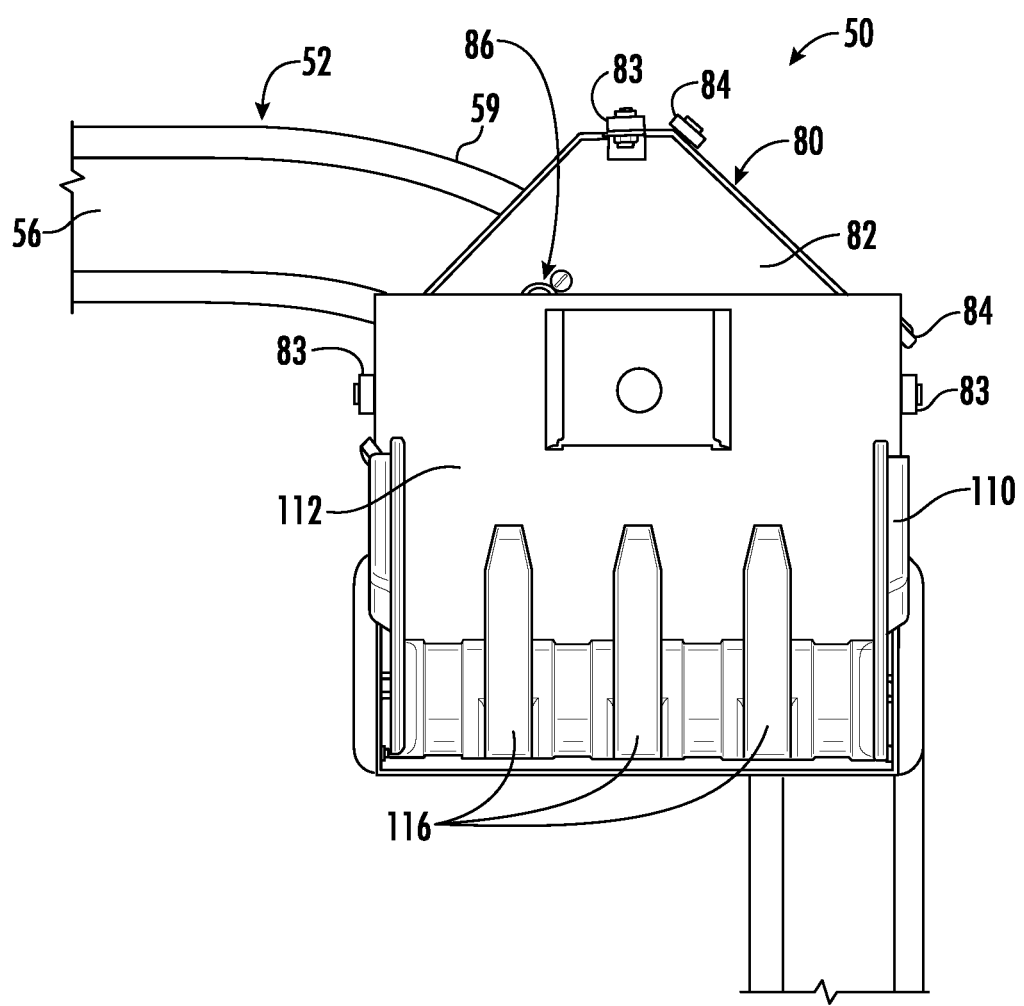
FIG. 18 is an elevational view of the arrangement shown in FIG. 17.
Figure 19:
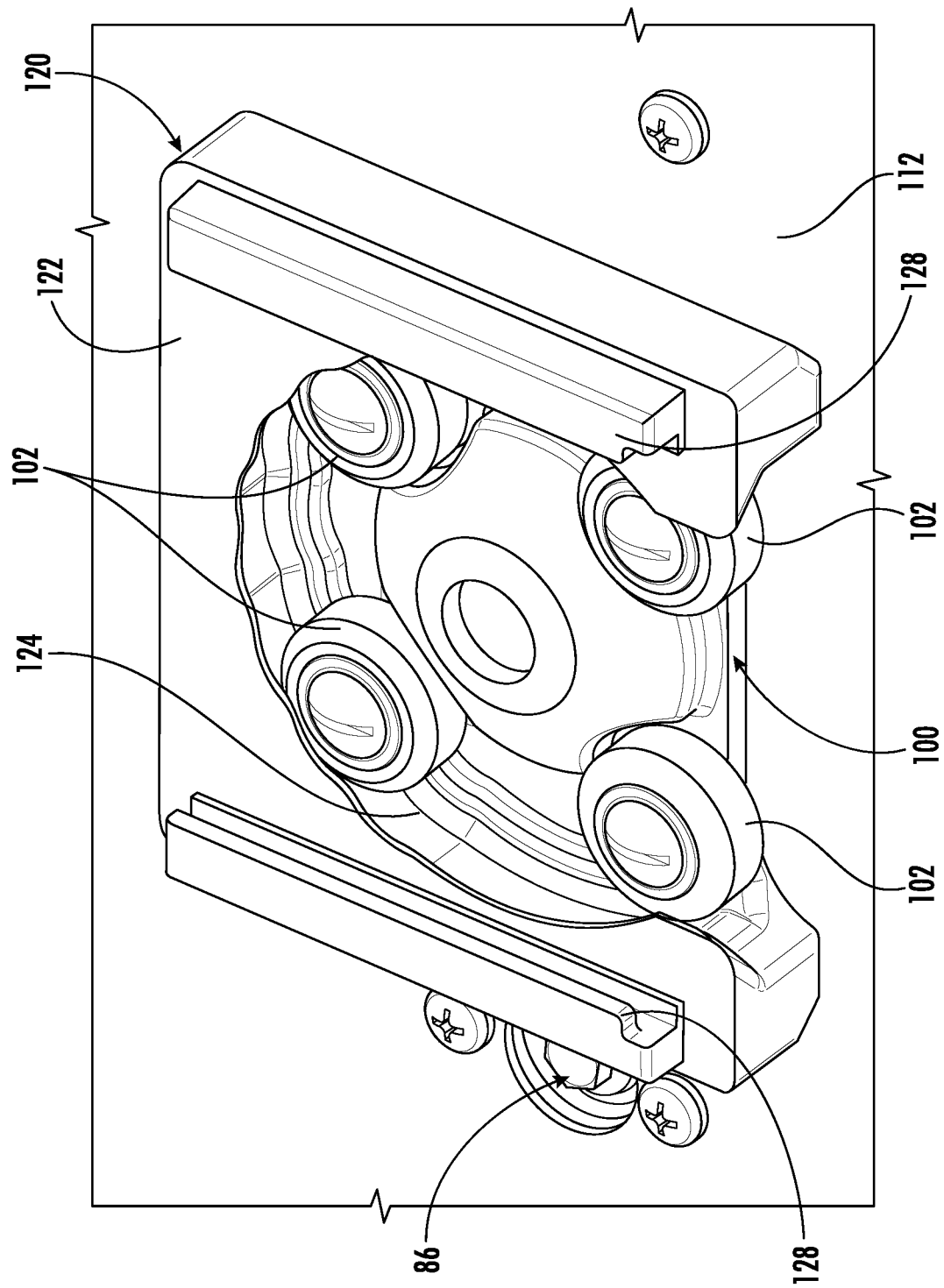
FIG. 19 is an enlarged perspective view showing the support connection on the support plate along with a housing of the mating connection that is configured to be connected to the back support of the carrier basket which allows the carrier basket to pivot by gravity so that the product support surface is maintained generally horizontal during movement of the carrier basket along the pathway.

As shown in FIGS. 8-11 and 13-16, the pathway 56 can include horizontal curved portions 58, and the first and second cars 60a, 60b are configured to pivot relative to one another and the support plate 82 as the support group 62 with the cars 60a, 60b travels around the horizontal curve portions 50a. Further, as shown in FIGS. 17 and 18, the pathway 56 also can include vertical curved portions 59, and the first and second cars 60a, 60b are configured to pivot relative to one another and the support plate 82 as the support group 62 with the cars 60a, 60b travels around the vertical curved portions 59.

Referring again to FIGS. 4 and 5, in order to provide enhanced stability, a stabilizer bar 64 can optionally be connected to the first car 60a and aligned generally normal to a direction of the pathway 56. Stabilizer rollers 66 are connected to the stabilizer bar 64, preferably at the ends thereof, that are spaced apart from the pivoting connection 86. These stabilizer rollers are configured to contact a side of the support plate 82 facing the pathway 56 in order to provide additional support and alignment for the support plate 82 as the first car 60a pivots relative to the support plate 82 while traversing the vertical curved portions 59 of the pathway 56.

In a preferred embodiment, the cars 60 include track rollers 68 that are configured to ride on the track 57 that defines the pathway 56. However, rollers are not required and slider blocks or other low-friction type guides could be utilized.

In one preferred embodiment, the first car 60a is the lead car and the second car 60b is the trailing car in a direction of travel of the group 60 of the cars 60a, 60b along the pathway. However, this could be reversed.

Using one or more of the above features, higher loads can be carried by the carrier basket 110 as it is supported on two of the cars 60a, 60b. In a preferred embodiment, the carrier basket 110 includes the support surface 114 formed with a plurality of spaced apart fingers 116 such that it could be used in a system similar to the system 10 in FIG. 1 as disclosed Applicant's prior U.S. Patent Application Publication 2021/0094761.

It will be appreciated that the foregoing is presented by way of illustration only and not by way of any limitation. It is contemplated that various alternatives and modifications may be made to the described embodiments without departing from the spirit and scope of the invention. Having thus described the present invention in detail, it is to be appreciated and will be apparent to those skilled in the art that many physical changes, only a few of which are exemplified in the detailed description of the invention, could be made without altering the inventive concepts and principles embodied therein. It is also to be appreciated that numerous embodiments incorporating only part of the preferred embodiment are possible which do not alter, with respect to those parts, the inventive concepts and principles embodied therein. The present embodiment and optional configurations are therefore to be considered in all respects as exemplary and/or illustrative and not restrictive, the scope of the invention being indicated by the appended claims rather than by the foregoing description, and all alternate embodiments and changes to this embodiment which come within the meaning and range of equivalency of said claims are therefore to be embraced therein.

The invention claimed is:

1. A carrier basket support and stabilizing system for a carrier basket transporter including a conveyor having a pathway, the system comprising:
    a plurality of cars configured to travel along the pathway, at least some support groups including two of the cars having a carrier basket support connected thereto, each said support group of two of the cars including a first car and a second car;
    the carrier basket support including:
        a support plate connected to the first car via a pivoting connection and connected to the second car by a pivoting and sliding connection such that the first and second cars are pivotable relative to the support plate and a distance between the first car and the second car can change during traversal of curves along the pathway; and
        a support connection located on the support plate configured for connection to a carrier basket on a side facing away from the pathway;
    the carrier basket including:
        a back support;
        a product support surface extending generally transversely from the back support in a direction opposite to the pathway; and
        a mating connection on the back support that is connected to the support connection; and
    the support connection and the mating connection form a pivot connection that provides for pivoting movement between the carrier basket and the support plate.

2. The system of claim 1, wherein the pivoting connection between the first car and the support plate comprises a spherical ball joint supported on the support plate and a bolt connecting the first car to the spherical ball joint.

3. The system of claim 1, wherein the pivoting and sliding connection between the second car and the support plate comprises a spherical pillow block bearing connected to a side of the support plate facing the pathway, and a rod that is fastened to the second car that extends generally parallel to the pathway, the rod extending through the spherical pillow block bearing such that the second car can pivot relative to the support plate and move closer to or further from the first car by the rod sliding in the spherical pillow block bearing.

4. The system of claim 1, wherein the first car is the lead car and the second car is the trailing car.

5. The system of claim 1, further comprising track guide rollers located on a side of the support plate facing the pathway.

6. The system of claim 1, wherein the support connection comprises a plurality of connection rollers, and the mating connection comprises a housing having a part circular track that encloses greater than 180°, and the connection rollers are engaged in the part circular track such that the carrier basket is pivotable by gravity so the product support surface is maintained generally horizontal during movement of the carrier basket along the pathway.

7. The system of claim 1, wherein the pathway includes horizontal curved portions, and the first and second cars are configured to pivot relative to one another and the support plate as the support group of cars travels around the horizontal curved portions.

8. The system of claim 1, wherein the pathway includes vertical curved portions, and the first and second cars are configured to pivot relative to one another and the support plate as the support group of cars travels around the vertical curved portions.

9. The system of claim 1, further comprising a stabilizer bar connected to the first car and aligned generally normal to a direction of the pathway, and stabilizer rollers connected to the stabilizer bar spaced apart from the pivoting connection that are configured to contact a side of the support plate facing the pathway.

10. The system of claim 1, wherein the product support surface comprises a plurality of spaced apart fingers.

11. The system of claim 1, wherein the cars include track rollers that are configured to ride on a track that defines the pathway.

12. The system of claim 1, further comprising a flexible connector extending between the first and second cars.

13. A carrier basket support and stabilizing system for a carrier basket transporter including a conveyor having a pathway, the system comprising:
   a plurality of cars configured to travel along the pathway, at least some support groups including two of the cars having a carrier basket support connected thereto, each said support group of two of the cars including a first car and a second car;
   the carrier basket support including:
      a support plate connected to the first car via a pivoting connection and connected to the second car by a pivoting and sliding connection such that the first and second cars are pivotable relative to the support plate and a distance between the first car and the second car can change during traversal of curves along the pathway; and
      a support connection located on the support plate configured for connection to a carrier basket on a side facing away from the pathway;
   the carrier basket including:
      a back support;
      a product support surface extending generally transversely from the back support in a direction opposite to the pathway; and
      a mating connection on the back support that is connected to the support connection; and
   a plurality of support rollers located on the support plate, at least one of which is configured to contact the back support at a location spaced apart from the support connection.

14. The system of claim 13, wherein the support connection and the mating connection provide for pivoting movement between the carrier basket and the support plate, and two of the support rollers are in contact with the back support to receive cantilevered loads from articles loaded on the product support surface of the carrier basket.

15. The system of claim 13, wherein the pivoting connection between the first car and the support plate comprises a spherical ball joint supported on the support plate and a bolt connecting the first car to the spherical ball joint.

16. The system of claim 13, wherein the pivoting and sliding connection between the second car and the support plate comprises a spherical pillow block bearing connected to a side of the support plate facing the pathway, and a rod that is fastened to the second car that extends generally parallel to the pathway, the rod extending through the spherical pillow block bearing such that the second car can pivot relative to the support plate and move closer to or further from the first car by the rod sliding in the spherical pillow block bearing.

17. The system of claim 13, wherein the first car is the lead car and the second car is the trailing car.

18. The system of claim 13, further comprising track guide rollers located on a side of the support plate facing the pathway.

19. The system of claim 13, wherein the support connection comprises a plurality of connection rollers, and the mating connection comprises a housing having a part circular track that encloses greater than 180°, and the connection rollers are engaged in the part circular track such that the carrier basket is pivotable by gravity so the product support surface is maintained generally horizontal during movement of the carrier basket along the pathway.

20. The system of claim 13, wherein further comprising a stabilizer bar connected to the first car and aligned generally normal to a direction of the pathway, and stabilizer rollers connected to the stabilizer bar spaced apart from the pivoting connection that are configured to contact a side of the support plate facing the pathway.

* * * * *